L. W. RICHARDSON.
CUSHIONED WHEEL.
APPLICATION FILED OCT. 6, 1921.

1,432,569. Patented Oct. 17, 1922.

Inventor
L. W. Richardson,

By
Attorney

Patented Oct. 17, 1922.

1,432,569

UNITED STATES PATENT OFFICE.

LUTHER W. RICHARDSON, OF RUSBY, VIRGINIA.

CUSHIONED WHEEL.

Application filed October 6, 1921. Serial No. 505,815.

*To all whom it may concern:*

Be it known that LUTHER W. RICHARDSON, a citizen of the United States of America, residing at Rusby, in the county of Grayson and State of Virginia, has invented new and useful Improvements in Cushioned Wheels, of which the following is a specification.

The object of the invention is to provide a wheel suitable for use in connection with automobiles, trucks and similar vehicles whereby the necessary cushioning effect may be secured without the use of rubber, pneumatic and similar resilient tires, to the end that a more durable and wear resisting tread may be secured without dispensing with the yielding quality which is necessary to absorb or compensate for shocks and jars incident to the use of the wheel; and with this object in view the invention consists in a construction and combination of parts of which a preferred embodiment is shown in the accompanying drawings, wherein:—

Figure 1:
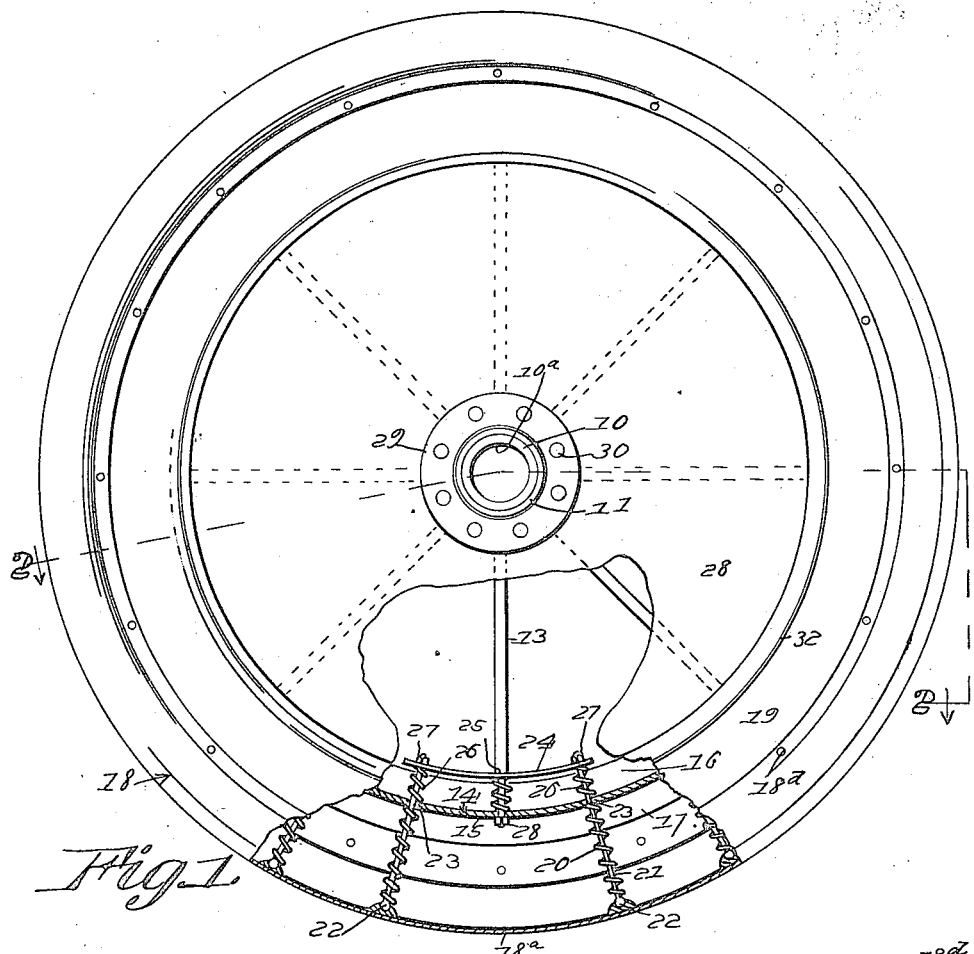
Figure 1 is a side view partly broken away of a wheel construction embodying the invention.
Figure 2:
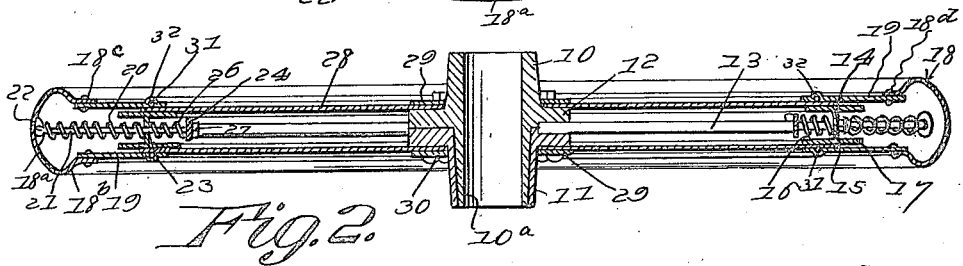
Figure 2 is a diametrical sectional view on the plane indicated by the line 2—2 of Figure 1.

The wheel consists essentially of a hub comprising the separable members 10 and 11 of which the former is provided with a tubular extension or thimble $10^a$ extending through the latter and forming the bearing, said hub sections each being provided with flanges 12 between which are fitted and secured in suitable sockets the inner ends of the spokes 13 which in turn are attached at their outer ends to the cross-sectionally H-shaped rim 14, said rim having the transverse circumferentially disposed body member 15 bounded by the inwardly and outwardly directed flanges 16 and 17; together with a yielding tire 18 of metal which is provided with annular inwardly extending cheek plates 19 arranged to overlap the rim and subject to radial movement with relation thereto to adapt the tire to yield under jars and excessive strains.

The tire which is of rigid construction is yieldingly held in its normal position with relation to the rim by means of cushioning springs 20 which are coiled upon guide rods 21 radially disposed between the tire and the rim, preferably having a universal connection with the former as by means of a ball and socket joint 22 or its equivalent and loosely passing through guide openings 23 in the body portion of the rim and through similar guide openings in bearing plates 24 which are carried by the spokes 13 and are mounted thereon for radial movement limited in an inward direction by shoulders or stops 25 or the equivalents thereof. Additional cushioning springs 26 are fitted upon the said guide rods 21 and the spokes 13 between the inner surface of the rim and the bearing plate 24 to yieldingly resist movement of said bearing plate toward the rim as the springs 20 yieldingly resist movement of the tire toward the rim. The tension of these springs may be regulated by means of nuts 27 threaded upon the inner extremities of the guide rods and a nut 28 threaded upon the outer extremity of the spokes, and the arrangement as will be obvious is such as in effect to support the rim between the sets of springs and hence in a floating relation with the tire, under conditions permitting movement in any direction toward the tire or that portion thereof which is in contact with the road surface.

As a means of protecting the springs and related parts from accumulations of dust, &c., the wheel is preferably provided with side or housing plates 28 extending from the hub flanges to and lying in overlapping relation with the flanges of the rim, and being secured to the former by means of annular fastening plates 29 secured by bolts 30 or the equivalents thereof, and in the construction illustrated the cheek plates 19 are disposed in exterior overlapping relation with the peripheries of the housing or side plates 28 (although obviously this relation may be reversed and as a further means of protection felt or like annular washers 31 may be carried by one of said sets of plates for contact with the surfaces of the other set, the said washers in the illustrated embodiment being fitted in annular seats 32 formed in the cheekplates 19 and functioning to retain oil inside the wheel for lubrication.

In the construction illustrated the tire consists of a ring of cross sectionally arched form constituting a tread $18^a$ and having inwardly directed flanges $18^b$ terminating in the radially disposed lips $18^c$ which lie parallel and in contact with the cheek plates and may be secured thereto by bolts or rivets $18^d$ or the equivalents thereof.

While as illustrated the tread is shown of smooth surface it will be obvious that it may be roughened or corrugated to afford the necessary or desired traction for engagement with the surface traversed to suit the conditions under which it is to be used or the purpose for which it is designed.

Having described the invention, what is claimed as new and useful is:—

1. A cushioning wheel having a hub, a rim rigidly connected with the hub by interposed spokes, bearing plates carried by the spokes within the area bounded by the rim, a tire having parallel annular cheek plates extending inward therefrom and disposed in overlapping movable relation with the rim and springs interposed between said bearing plates and the rim and between the tire and the rim and acting upon the latter in opposed relations, the bearing plates being limited in inward movement by stops on the spokes and guide rods having universal connection with the tire being extended inwardly through guide openings in the rim and said bearing plates, with the springs which are interposed between the bearing plate and the rim coiled upon the portions of the spokes and said guide rods between the bearing plates and rim, and the springs between the rim and tire coiled upon said guide rods.

2. A cushioning wheel having a hub, a rim and interposed spokes rigidly connecting the hub with the rim, bearing plates carried by the spokes within the area bounded by the rim, said spokes being formed with shoulders for abutting engagement by said bearing plates, a tire in surrounding relation to the rim, guide rods terminally and universally connected with the tire and passing through openings formed in the rim and engaged at their inner ends in the bearing plates, springs in surrounding relation to said guide rods and compressed between said bearing plates and said tire, and other springs in surrounding relation to the spokes between said bearing plates and said rigidly attached rim.

3. A cushioning wheel having a hub, a rim rigidly connected with the hub by interposed spokes, bearing plates carried by the spokes within the area bounded by the rim, a tire having parallel annular cheek plates extending inward therefrom and disposed in overlapping movable relation with the rim and springs interposed between said bearing plates and the rim and between the tire and the rim and acting upon the latter in opposed relations, the said tire having a cross sectionally arched tread surface and provided with inwardly directed side flanges terminating in radially disposed lips to which said cheek plates are secured.

In testimony whereof he affixes his signature.

LUTHER W. RICHARDSON.